United States Patent
Keller et al.

(12)

(10) Patent No.: US 6,347,172 B1
(45) Date of Patent: Feb. 12, 2002

(54) CABLE HAVING SIDE-EMITTING FIBER UNDER TRANSPARENT OR TRANSLUCENT CABLE JACKET

(75) Inventors: David A. Keller, Apex; Tom C. Goebelbecker, Cary, both of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/604,972

(22) Filed: Jun. 28, 2000

(51) Int. Cl.[7] .............................. G02B 6/44; G02B 6/00
(52) U.S. Cl. ........................................ 385/102; 385/901
(58) Field of Search ................................. 439/102, 127, 439/901, 106

(56) References Cited

U.S. PATENT DOCUMENTS

| 5,506,674 A | 4/1996 | Inoue et al. |
| 5,577,147 A | 11/1996 | Arroyo et al. |
| 5,638,483 A | 6/1997 | Konwitz |
| 5,671,308 A | 9/1997 | Inoue et al. |
| 5,708,499 A | 1/1998 | Baden et al. |
| 5,905,837 A | 5/1999 | Wang et al. |
| 5,982,967 A * | 11/1999 | Mathis et al. ................ 385/102 |
| 5,987,199 A * | 11/1999 | Zarian et al. .................. 385/31 |
| 5,995,702 A * | 11/1999 | Tjonneland .................. 385/901 |
| 6,275,644 B1 * | 8/2001 | Domas et al. ............... 385/146 |

* cited by examiner

*Primary Examiner*—Brian Sircus
*Assistant Examiner*—Chandrika Prasad
(74) *Attorney, Agent, or Firm*—Sughrue Mion, PLLC

(57) ABSTRACT

An optically observable cable and method of manufacturing the same, the optically observable cable including a conduit for conducting signals and a side-emitting optical fiber disposed on a periphery of the conduit and extending along a length of the conduit, and a cable jacket encapsulating the conduit and the side-emitting optical fiber, wherein the cable jacket is at least partially translucent such that the side-emitting optical fiber is optically exposed through the cable jacket. A method of detecting individual cables from amongst a plurality of signal transmission cables each having a side-emitting optical fiber includes positioning a light source at an interface which houses and end of a cable to be detected, transmitting light from the light source into the interface, and observing light emitted from an axis of a cable to be detected.

17 Claims, 13 Drawing Sheets

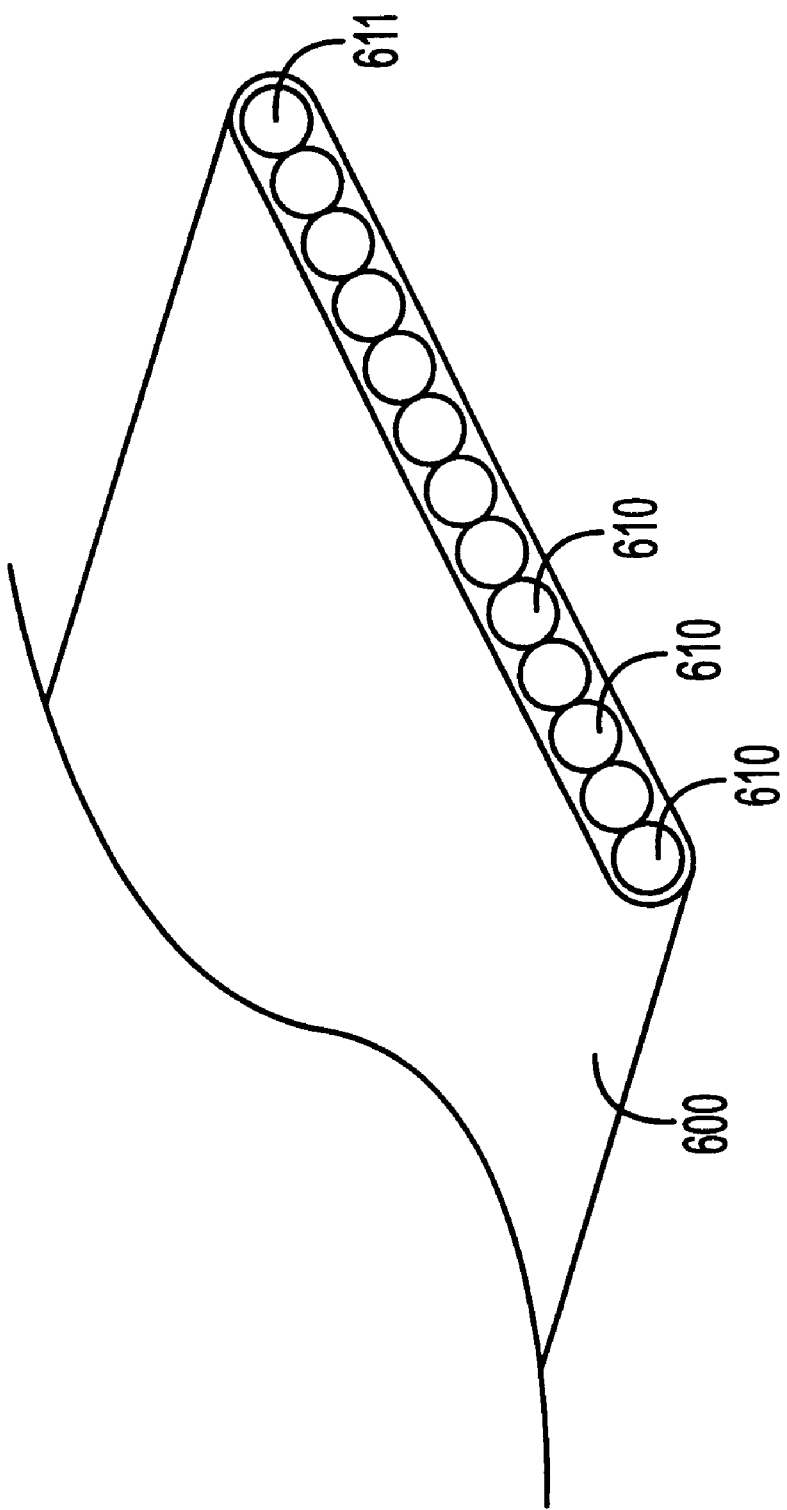

CABLE HAVING SIDE-EMITTING FIBER UNDER TRANSPARENT OR TRANSLUCENT CABLE JACKET

FIELD OF THE INVENTION

The present invention relates to an optically detectable transmission cable, method for manufacturing the same, and a method for identifying optically detectable cables in a complex cabling system. More particularly, the present invention relates to a transmission cable having a side-emitting optical fiber included in a transparent or translucent cable jacket in order to assist in identifying the transmission cable at any point along its length.

BACKGROUND OF THE INVENTION

Communication networks typically involve a distribution system in which main transmission lines are routed into a building or office to a distribution point. At the distribution point, several communication lines or cables are split from the main lines and directed into various sublevel systems including wiring closets and patch panels, from which more cables are subsequently routed to individual devices such as telephones, computers, fax machines, etc.

Interconnections at the sublevel systems are also provided in connection with switches and receiver/transmitter units at intervals along a communication line for regenerating, for example, optical signals. These optical/electrical interfaces, in connection with test equipment and monitoring devices, at various sites within the system have large communication panels to which large numbers of communication lines may be connected. A patch panel may consist of several modules each having hundreds of input/output adapters which are connected to numerous communication lines. These communication lines may consist of a bundles of cables with separated ends for making individual connections.

Consequently, in such wiring systems, there are significantly large amounts of cables present. Identification of individual cables becomes problematic in that the cables may be intricately intertwined and/or positioned in inaccessible areas. The connections of these communication lines to and from the panels are often made by technicians, where the technician needs to identify the cable and the adapter to which the cable is to be connected or disconnected. Because of the enormous amount of cables that may be present in such a complex cabling system, a technician may have difficulty finding a particular cable to which an operation is to be performed. Therefore, there exists a need to efficiently identify individual cables of a complex cabling system at any point along the length of an individual cable.

Conventionally, it is well known in the art to provide cables with color coded stripes to assist in identifying individual cables. However, when a sizeable number of cables are present, the number of color-coded cables available may be insufficient. Thus, the color stripes of a complex cabling system are repetitively used, making identification of a particular cable impossible. Additionally, in small enclosed spaces with poor lighting, such as a wiring closet, it is difficult to ascertain one color from another.

SUMMARY OF THE INVENTION

It is therefore an object of the present invention to solve the foregoing problems, by providing a cable which is easily identifiable along an entire length, even when the cable is located in the vicinity of numerous other cables, and/or in a poorly lit environment. In order to achieve this object and others, an optically observable cable is provided having a transmission cable and a side-emitting optical fiber disposed on a periphery of the transmission cable and extending along a length of the transmission cable wherein the transmission cable and side-emitting optical fiber are enclosed in at least a partially translucent cable jacket. The optically observable cable is illuminated along its entire length when light is provided at an end of the side-emitting optical fiber, such that the optically observable cable may be detected at any point along its length.

Another object of the present invention is to provide a communication system having a plurality of optically detectable cables including a transmission unit for transmitting communication signals through the plurality of optically detectable cables and a receiving unit for receiving the transmitted communication signals, wherein each of the optically detectable cables includes a conduit for conducting the communication signals, a side-emitting optical fiber, and a cabling jacket housing the conduit and side-emitting optical fiber, wherein the cabling jacket has a translucent portion to allow the side-emitting optical fiber to be observed.

It is yet another object of the present invention to provide a method for detecting individual cables amongst a plurality of cables having side-emitting fibers by positioning a light source at an interface housing an end of a cable to be detected, transmitting light from the light source into the interface, and observing light emitted from the side-emitting optical fiber of the cable to be detected.

Yet a further object of the invention is to provide a method of manufacturing a cable having a side-emitting optical fiber by pulling a conduit for conducting signals into a cable forming device, pulling a side-emitting optical fiber into the cable forming device along side said conduit for conducting a signal, and extruding a cable jacket onto or around the conduit and side-emitting optical fiber as the conduit and the side-emitting optical fiber are pulled into said cable forming device, wherein at least a portion of said cable jacket is made of a translucent material to allow the side-emitting optical fiber to be observed therethrough.

These and other objects of the invention will become apparent as described below in reference to the appended drawings.

BRIEF DESCRIPTION OF THE DRAWINGS

FIGS. 11–13: illustrate example conduits having side-emitting optical fibers.

DETAILED DESCRIPTION OF THE DRAWINGS

Figure 1A:
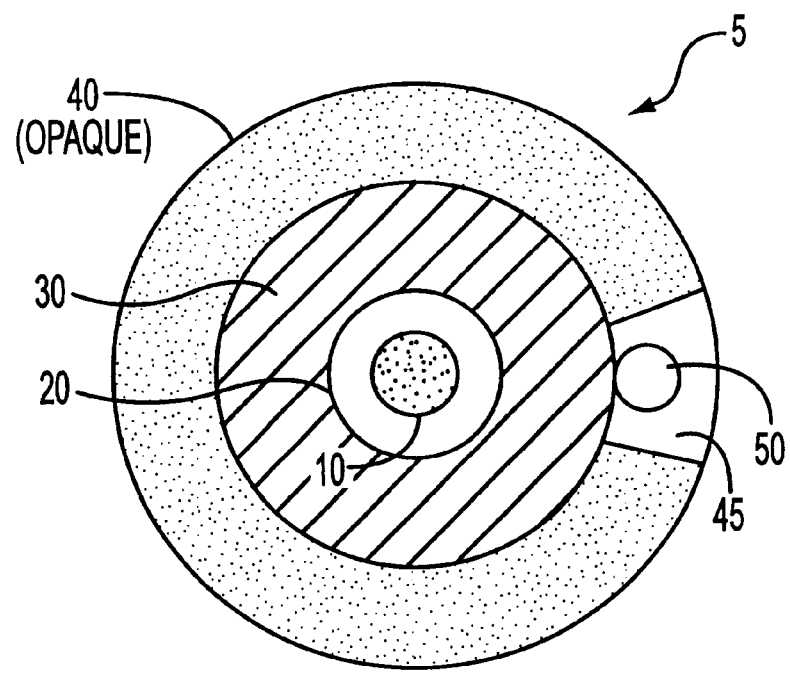
FIGS. 1a to 1d: illustrate a cross-section of a cable having a side-emitting optical fiber according to an exemplary embodiment to the present invention.

As described below in reference to the drawings, like reference numerals are intended to represent like elements in the subsequent illustrations.

Figure 1B:
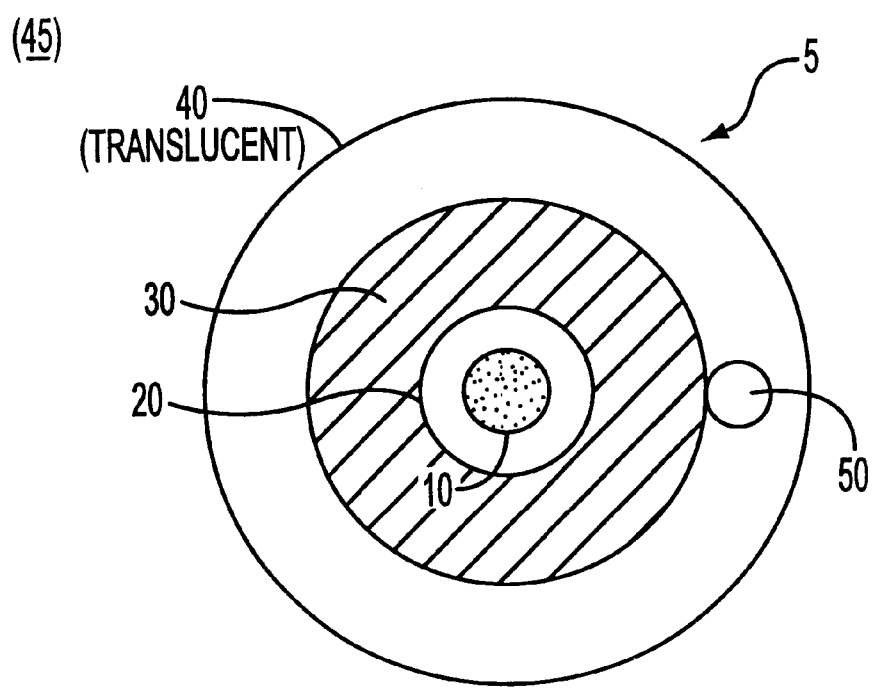

FIGS. 1a and 1b illustrate cross sections of a fiber optic communication cable 5 having a side-emitting optical fiber 50 according to an exemplary embodiment of the present invention. The fiber optic communication cable 5 preferably has an optical fiber 10, such as a step index single-mode or graded index multi-mode optical fiber with protective UV cured acrylate coating/cladding, a buffer 20 made of a buffer jacket material such as PVC, an aramid strength layer 30, and a cable jacket 40 made of an flexible insulating material, for example, PVC. A preferred embodiment utilizes a 0.250 mm outer diameter optical fiber 10 upjacked to a 0.900 mm outer diameter buffer 20.

The fiber optic communication cable 5 of this embodiment has a side-emitting optical fiber 50 disposed on an outer periphery of the aramid strength layer 30 and, as shown in FIG. 1a, is embedded in a translucent cable jacketing material 45. Aramid strength layer 30 is preferably Dupont KEVLAR® or Akzo Twaron®. The translucent jacketing material 45 is a flexible translucent insulating material, and allows the side emitting optical fiber to be observed therethrough. The remaining portion of cable jacket 40 is made of a traditional opaque jacketing material, preferably a flame retardant PVC.

Side emitting optical fibers 50 are well known in the art and commercially available for a wide variety of uses. Some examples of commercially available side-emitting optical fibers are the Side Glow ® Fiber Optic Cable manufactured by Super Vision International, Inc. (http//www.svision.com), the side-emitting optical fibers available from Intelite, Inc. (http//www. intelite.com), and the V-grade Luminous side-emitting optical fibers available from Asahi Chemical Industry Co., Ltd. (http://www.asahi-kasei.co.jp). These side-emitting optical fibers are not used for transmission of data, as are ordinary optical fibers, but are used primarily for decorative purposes such as illuminating swimming pools, floor light, etc.

The present invention utilizes the luminescent advantages of the side-emitting optical fiber along with all the advantages of optical transmission fibers to provide a highly efficient and optically detectable transmission cable.

Figure 1C:
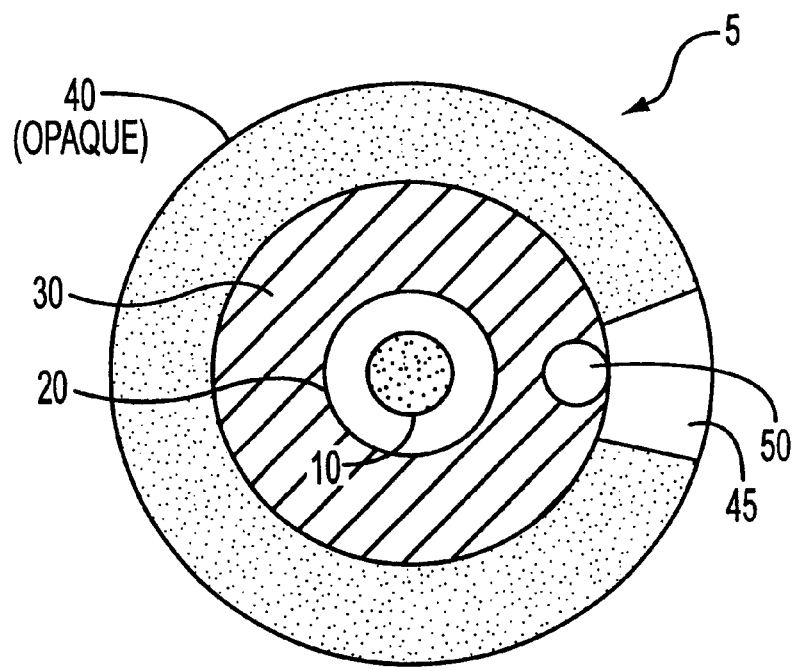
Figure 1D:
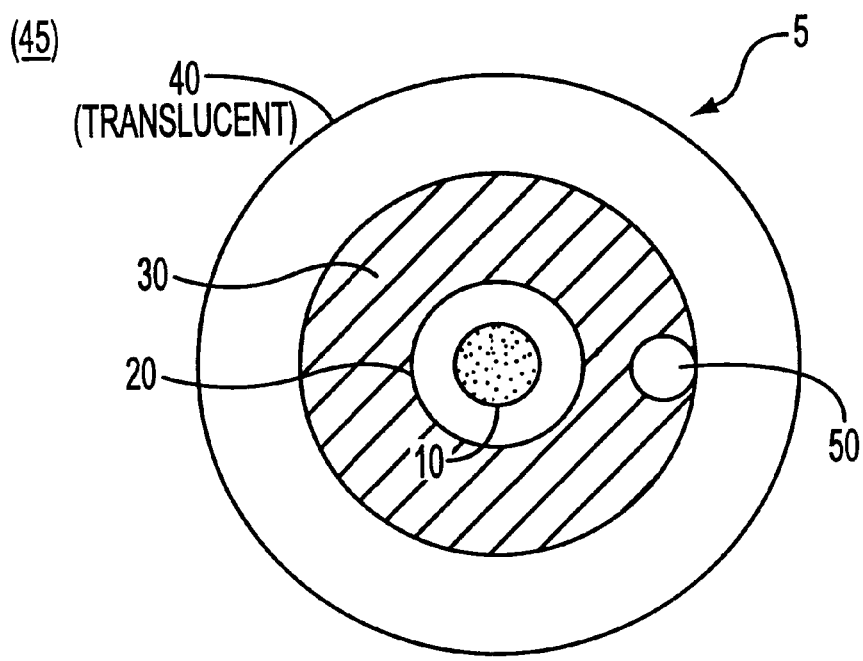

The fiber optic communications cable 5 illustrated in FIG. 1b. is similar to that of FIG. 1a, except that the cable jacket 40 is made completely of translucent jacketing material 45, thus the manufacturing process may be simplified as discussed in further detail below. FIGS. 1c and 1d illustrate this embodiment where the side-emitting optical fiber 50 is positioned entirely underneath cable jacket 40. Although FIGS. 1c and 1d explicitly show this minor variation from FIGS. 1a and 1d, the inventors contemplate the same in regard to any of the following embodiments.

Figure 2A:
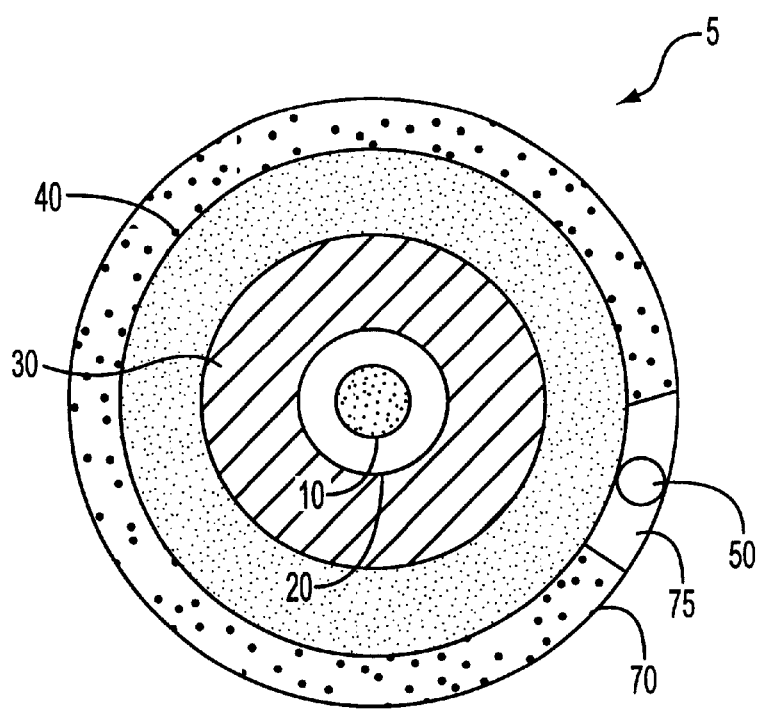
FIGS. 2a and 2b: illustrate a cross-section of a cable having a side-emitting optical fiber according to a second embodiment of the present invention.
Figure 2B:
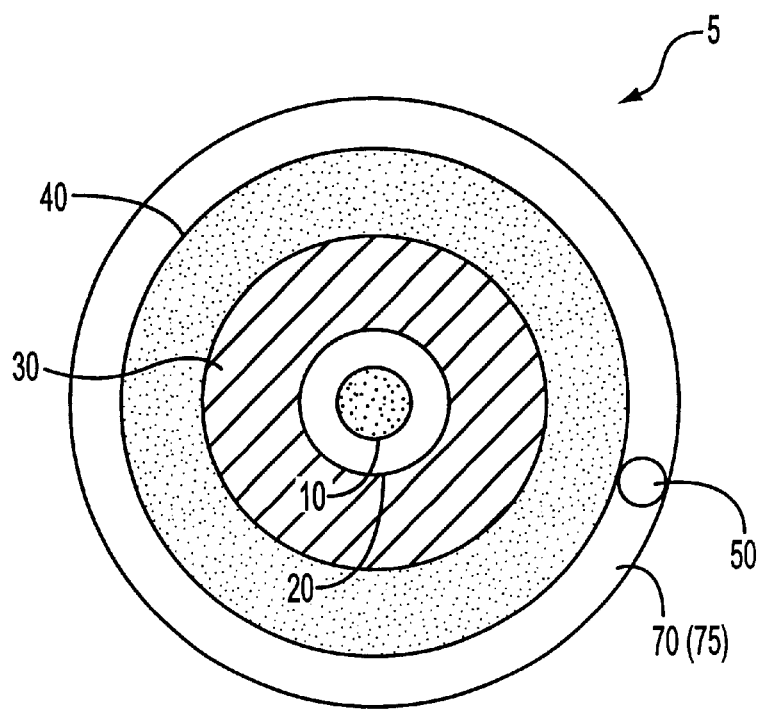

FIGS. 2a and 2b illustrate cross-sections of a fiber optic communication cable 5 according to a second embodiment of the present invention. The embodiment shown in FIGS. 2a and 2b is similar to the first embodiment, except that the side-emitting optical fiber 50 is located on an outer perimeter of cable jacket 40, and an additional cable jacket 70 houses the side-emitting optical fiber 50 and is the outermost layer of the fiber optic communication cable 5. In FIG. 2a, a portion of cable jacket 70 is made of translucent material 75 for exposing the side-emitting optical fiber 50, while the remaining portion of cable jacket 70 is made of opaque jacketing material. The fiber optic communication cable illustrated in FIG. 2b is similar to that of FIG. 2a, except that the cable jacket 70 is made entirely from translucent material 75. In this manner, the manufacturing process may be simplified. One unique feature of the fiber optic communication cable 5 of the second embodiment is that a pre-existing fiber optic cables may be improved by adding a side-emitting optical fiber 50 to its periphery and enclose the cable in a translucent jacket to add optically detectable characteristics.

Figure 3A:
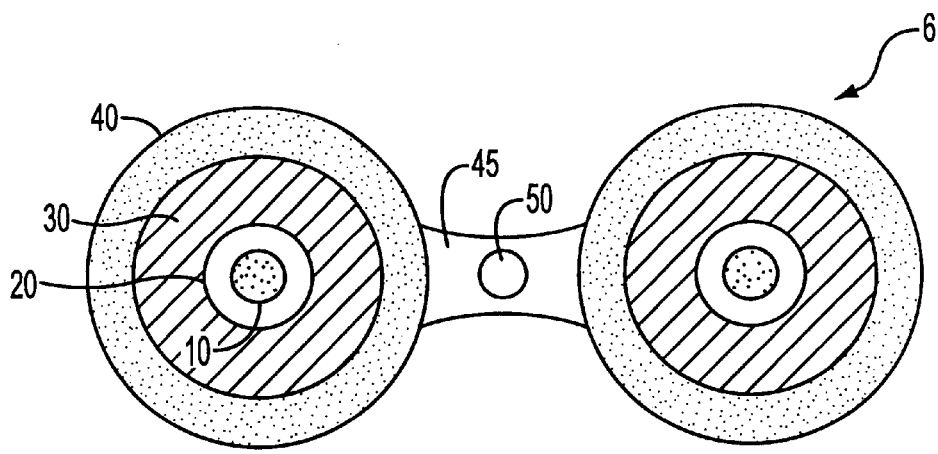
FIGS. 3a to 3c: illustrate a cross-section of a dual cable having a side emitting optical fiber according to a third embodiment of the present invention.
Figure 3B:
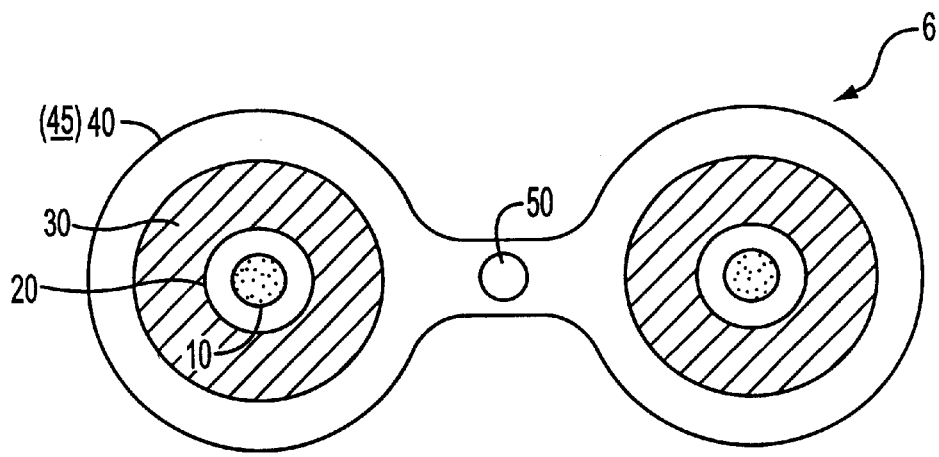

FIGS. 3a and 3b illustrate cross sections of a dual fiber optic communications cable 6 having a side-emitting optical fiber 50 according to a third embodiment of the present invention. In this embodiment, there are two optical fibers 10 for data transmission. As shown in FIG. 3a, the cable jacket 40, has a translucent portion 45, which joins the two optical fibers 10 and houses the side-emitting optical fiber 50 inside.

Figure 3C:
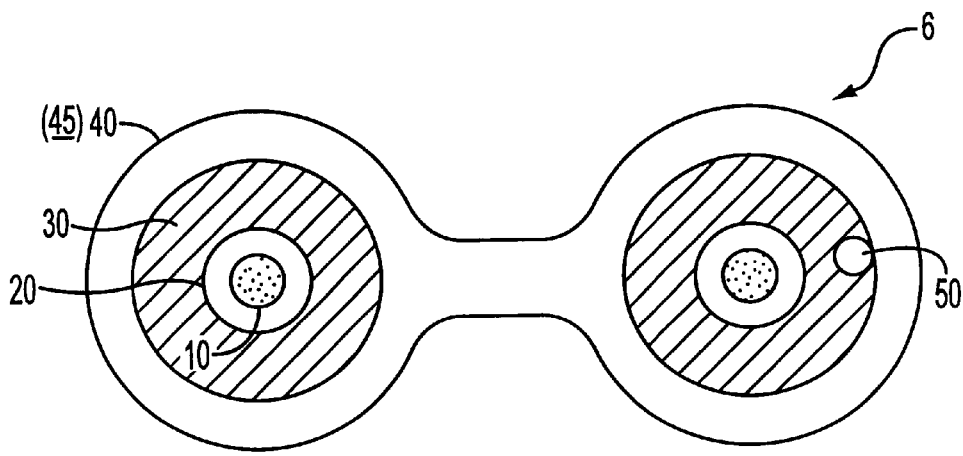

As with the previous embodiments, and as shown in FIG. 3b, the entire cable jacket 40 may be made of translucent material 45 to simplify a manufacturing process. FIG. 3c illustrates this embodiment where instead of placing the side-emitting optical fiber 50 in the middle portion of cable jacket 40, it is positioned underneath the cable jacket 40 of one of the optical fibers for transmission 50.

Figure 4:
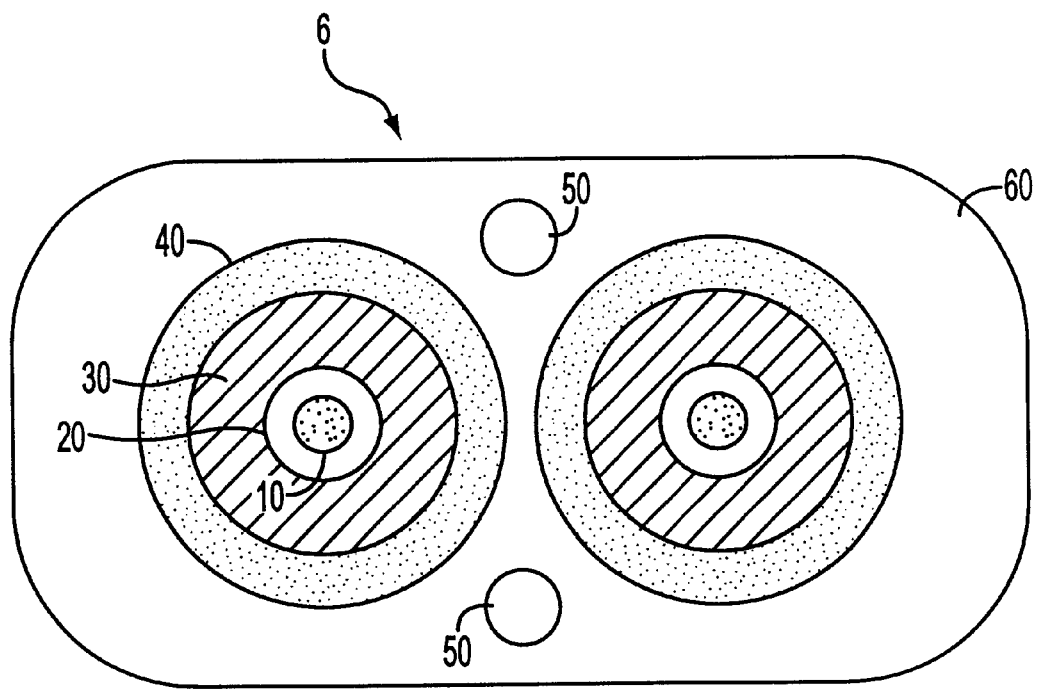
FIG. 4: illustrates a cross-section of a dual cable having two side emitting optical fibers according to a fourth embodiment of the present invention.

FIG. 4 illustrates a cross-section of a dual fiber optic communication cable 6 having two side-emitting optical fibers 50 according to a fourth embodiment of the present invention. Here, two optical fibers 10 for transmission, are encapsulated in a translucent cable jacket 60 along with two side-emitting optical fibers 50. In this embodiment, a communication cable may be optically detected via the side-emitting optical fibers no matter which side of the cable that is exposed to an observer, as there is a side emitting optical fiber located on two sides of the communication cable.

While the previous embodiments have only been described as using one side-emitting optical fiber 50, the inventors contemplate the use of two or more side-emitting optical fibers in any of the embodiments described herein, as well as those that would be apparent to one with ordinary skill in the art.

Figure 5:
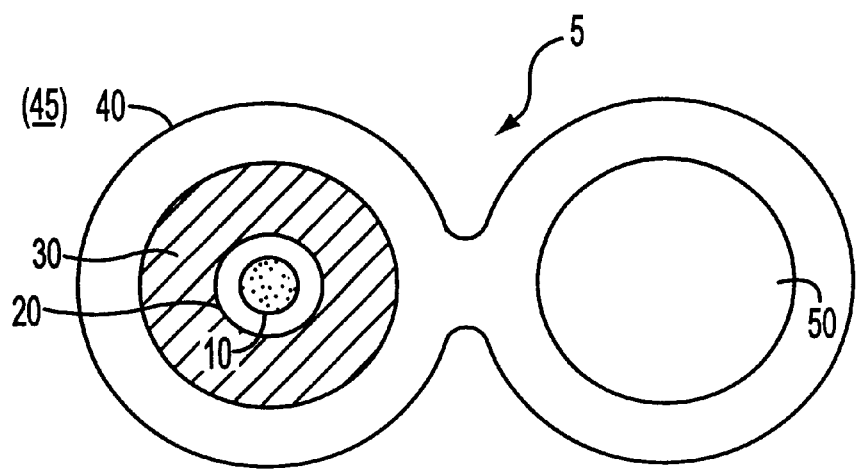
FIG. 5: illustrates a cross-section of a modified cable having a side-emitting optical fiber according to the present invention.

FIG. 5 illustrates a modified fiber optic communication cable 5 having a side-emitting optical fiber 50. As illustrated, the communication cable 5 is shown in a zip cord configuration with the side-emitting optical fiber 50 running adjacent to the optical fiber for transmission 10. Here, the cable jacket 40 is made entirely of translucent jacketing material 45.

Figure 6:
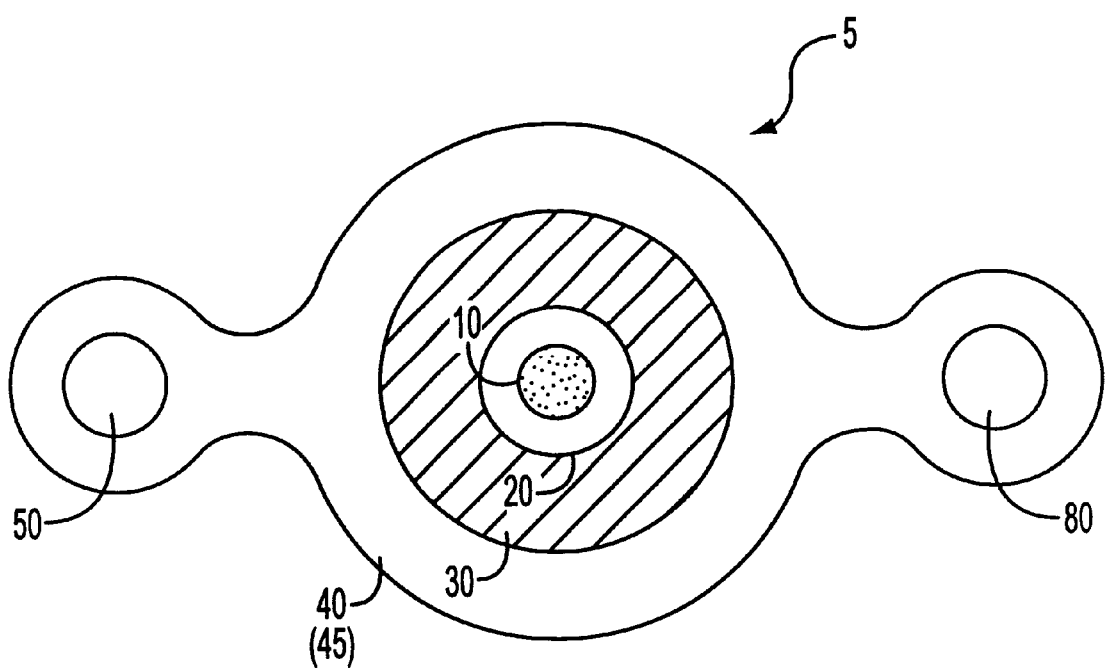
FIG. 6: illustrates a cross-section of a cable having a side-emitting optical fiber and an a second conduit according to a fifth embodiment of the present invention.

FIG. 6 illustrates a cross-section of a fiber optic communication cable 5 having a side emitting optical fiber 50 and a conductor 80 according to a fifth embodiment of the present invention. Cable jacket 40 is made from translucent jacketing material 45, and encapsulates the optical fiber 10 for transmission, the side-emitting optical fiber 50, and the electrical conductor 80, which may be a copper wire. In this embodiment, the communication cable 5 is desirable for applications which use both optical and electrical signal transmissions, such as a circuit where power is needed.

Figure 7:
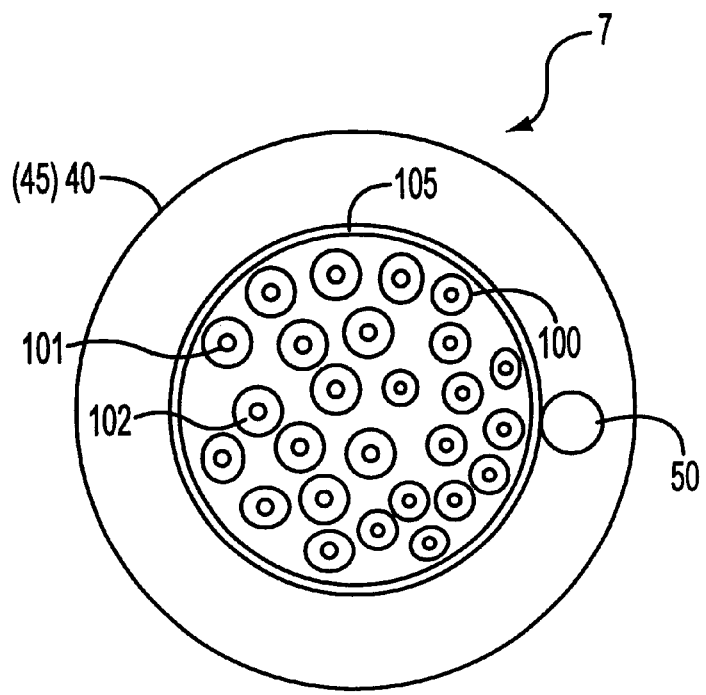
FIG. 7: illustrates a cross-section of a modified cable having a side-emitting optical fiber according to the present invention.

FIG. 7 illustrates a cross section of a modified cable 7 having a side-emitting optical fiber 50. Here, electrical conductors 100 are used as the means for conducting signals. Electrical conductors 100 are twisted pairs having copper conductors 101 and insulators 102, although any known wiring configuration is contemplated, such as a solid power conductor, and power control cables. Additionally, although not necessary, the modified cable 7 may have a conductive shielding member 105 disposed between the twisted copper pairs and cable jacket 40 to reduce EM interference and prevent noise.

Securing the side emitting fiber to the cable can vary as shown in the case where the side emitting fiber can be under the jacket as in FIGS. 1c–1d, encapsulated by the jacket material as shown in FIGS. 1a–b, or barely encapsulated as shown in 2a–b. The inventors contemplate all combinations of securing the side emitting fiber to the foregoing embodiments and any variations as mentioned.

While specific fiber optic and electrical cables have been described in respect to preferred embodiments, the inventors contemplate all combinations of the foregoing embodiments and any variations which would be apparent to skilled artisans, but are too numerous to specifically describe.

For example, the cables having side-emitting optical fibers have been described above primarily in reference to fiber optic communication cables having side-emitting optical fibers. However, one with ordinary skill in the art would understand that any of the embodiments may be equally implemented with electrically conductive cables, pneumatic tubes for conducting air or water, as well as any other type of longitudinal conduit in which it would be desirable to improve optical detectability. Examples of such embodiments are described below.

The translucent jacketing material of the foregoing embodiments may be tinted with or without color shading pigment and allows the side emitting fibers to be seen when illuminated with a light source. Additionally, the side-emitting optical fibers of the present invention may be clear or tinted with color as both are commercially available.

Figure 8:
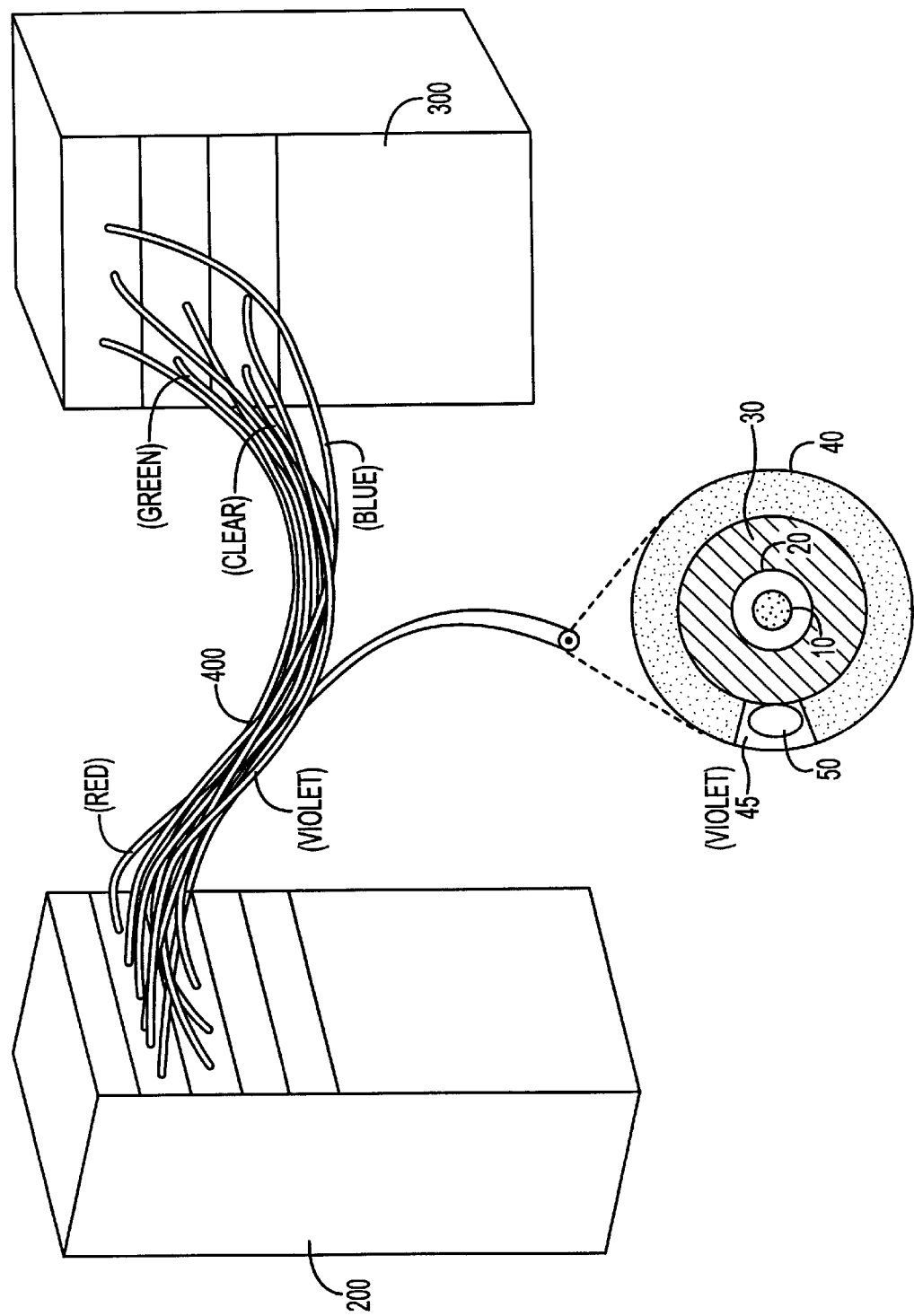
FIG. 8: illustrates a communication system having a plurality of communication cables having side-emitting optical fibers.

Using color-tinted translucent jacketing material or color tinted side-emitting optical fibers in a communication system having numerous optically detectable cables as shown in FIG. 8, promotes the ability to illuminate the side-emitting fibers of multiple cables simultaneously while detecting an individual cable by observing the color of the light emanating from the respective cables.

FIG. 8 illustrates a generic communication system, for example, two patch panels, including a transmission unit 200, a receiving unit 300, and numerous optically detectable communication cables 400 connected therebetween to accommodate the transmission of communication signals. Each of the optically detectable communication cables have side-emitting optical fibers 50, as illustrated by the cross section. Solely by way of example, the illustrated cross section of one of the optically detectable communication cables 400 is similar to the fiber optic communication cable 5 illustrated in FIG. 1, but could also be implemented via any of the contemplated cable configurations.

As shown in FIG. 5, the side-emitting optical fiber 50 is embedded in translucent jacketing material 45 of the cable jacket 40. Here, the translucent jacketing material is designated as having a violet tint. When a detecting light is put into the ends of the optically detectable cables 400, the individual cable emitting a violet light along its axis may be easily detected amongst the various other cables present (i.e. red, blue, clear, green, etc).

However, if all the optically detectable cables have the same color, for example, clear, individual cables may be optically distinguished by inputting detecting light into cable ends of the cables to be detect. The cable or cables to be detected light up along their respective axes.

Figure 9:
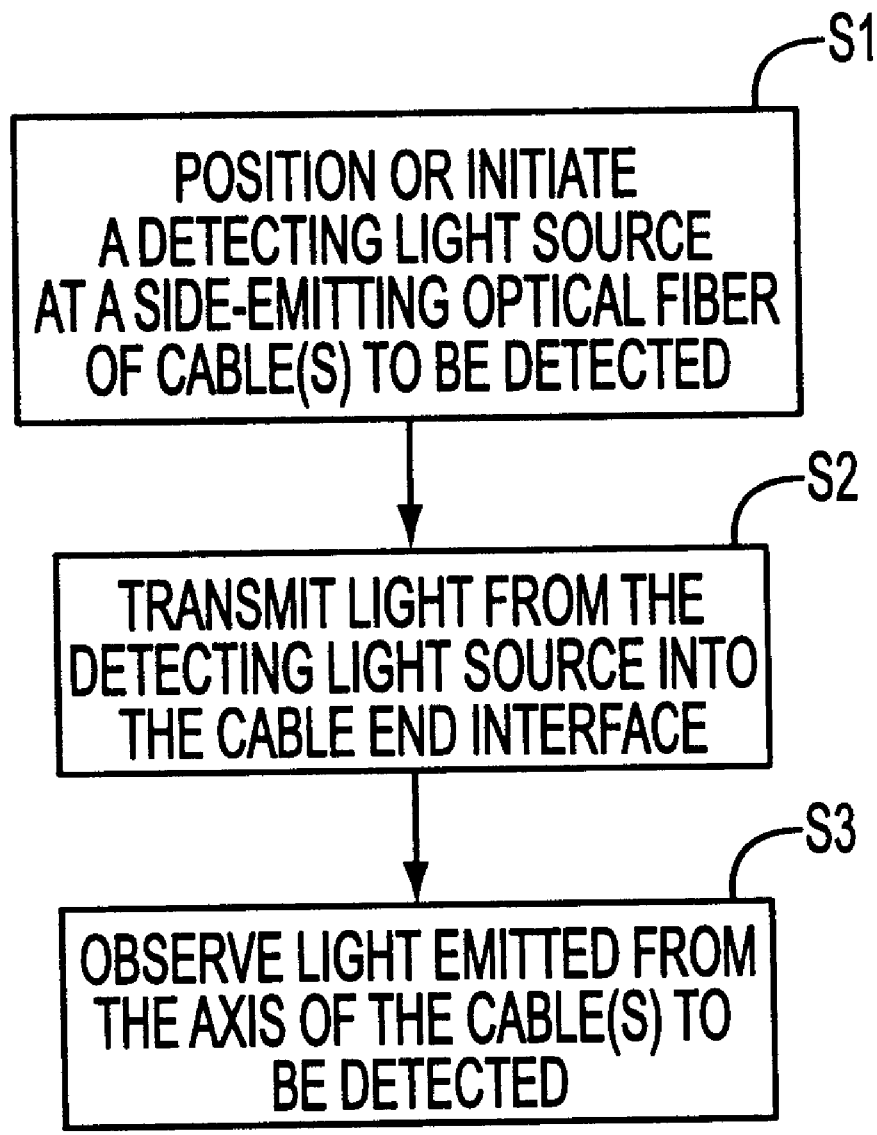
FIG. 9: illustrates a flow chart detailing a method for detecting individual cables of a complex cabling system.

A method for detecting individual cables of a complex cabling system, for example, the communication system of FIG. 8, is illustrated in FIG. 9. At step S1, a light source or detector light is positioned an interface housing an end of a cable or cables to be detected. Typically, the cable ends have an adapter or interface to promote connection of the cable ends to different communication or wiring connection ports on the communications system.

The communication system may have a detecting light source, such as an LED, laser, or incandescent lamp, built in to each of the connection ports so that disconnecting the cable to be detected from its respective connection port is not necessary. In this case, when initiated at step S2, the detecting light source transmits light into the interface housing of the respective cables to be detected. To detect individual cables at step S3, a user observes light emitted from the side-emitting optical fiber along an axis of the respective cables to be detected.

However, if the communication system does not have a built-in detecting light source, a hand-held detecting light may be used. This hand-held detection light source may either be adapted to be connected to the cable end interface, or by injecting the detecting light through the side of the cables 400 into the side-emitting optical fiber 50. Here, a user is required to manually position the detecting light source at the interface housing an end of a cable or cables to be detected. The detecting light transmits light into the cables to be detected, and the user detects individual cables by observing light emitted along their axes. The hand-held detecting light may also be an LED, laser, or incandescent light source.

As previously stated, if various colors of translucent jacketing material or side-emitting fibers are used for each cable, multiple cables may be illuminated at one time and the cables are detected by the color of light emitted along their respective axes.

Figure 10A:
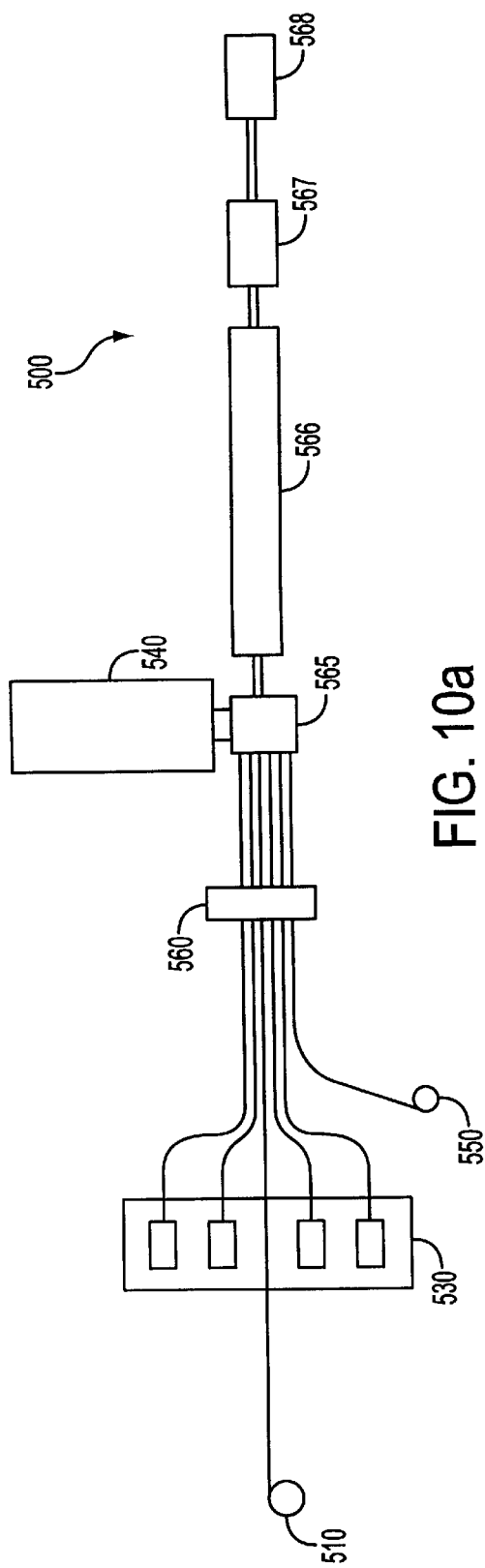
FIGS. 10a and 10b: illustrate a cable manufacturing device for a method of manufacturing a cable having a side emitting optical fiber.

Now, a method of manufacturing a side emitting optical fiber will be explained. FIG. 10a illustrates a cable forming device 500 for manufacturing the above-described cables. Here, an optical fiber is drawn from a fiber payoff roll 510, along with aramid yarns from a plurality of aramid payoffs 530, and a side-emitting optical fiber from side-emitting fiber payoff 550, into a cable forming device. The strands of the respective payoffs are pulled through lay plate 560 and cross-head tip and die 565 by a pulling device 567 or capstan. As the fibers are arranged by the lay plate and compressed by the cross-head tip and die 565, a translucent jacketing material 45 is extruded onto the fibers from extruder 540. The extruded cable is then pulled through cooling trough 566 and the finished cable is collected on take-up reel 568. The aforementioned manufacturing process produces a cable having a side-emitting optical fiber and an entirely translucent cable jacket.

Figure 10B:
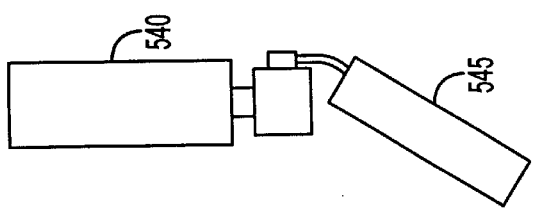

On the other hand, FIG. 10b shows a modification to the cable forming machine for producing a cable having an opaque outer jacket where only a portion the cable jacket is made of translucent jacketing material 45. For this type of cable, a second extruder 545 is used with a striping tip to stripe the opaque cable jacket with a translucent portion. Dual extruders for striping cables are well known in the art and thus are not explained in significant detail. Opaque jacketing materials may have flame retardant fillers, thus this option may serve to provide a more flame-resistant cable having a side-emitting optical fiber than that of with an entirely translucent cabling jacket.

The foregoing manufacturing method using cable manufacturing device 500 is not limited to fiber optic cables, but may be used to produce electrical conductor cables as would be apparent to one of ordinary skill in the art. The cable manufacturing device 500 may also be setup to pull more than one optical fiber or electrical conductor into a single cable or form any of the cable-embodiments described above.

Figure 12:
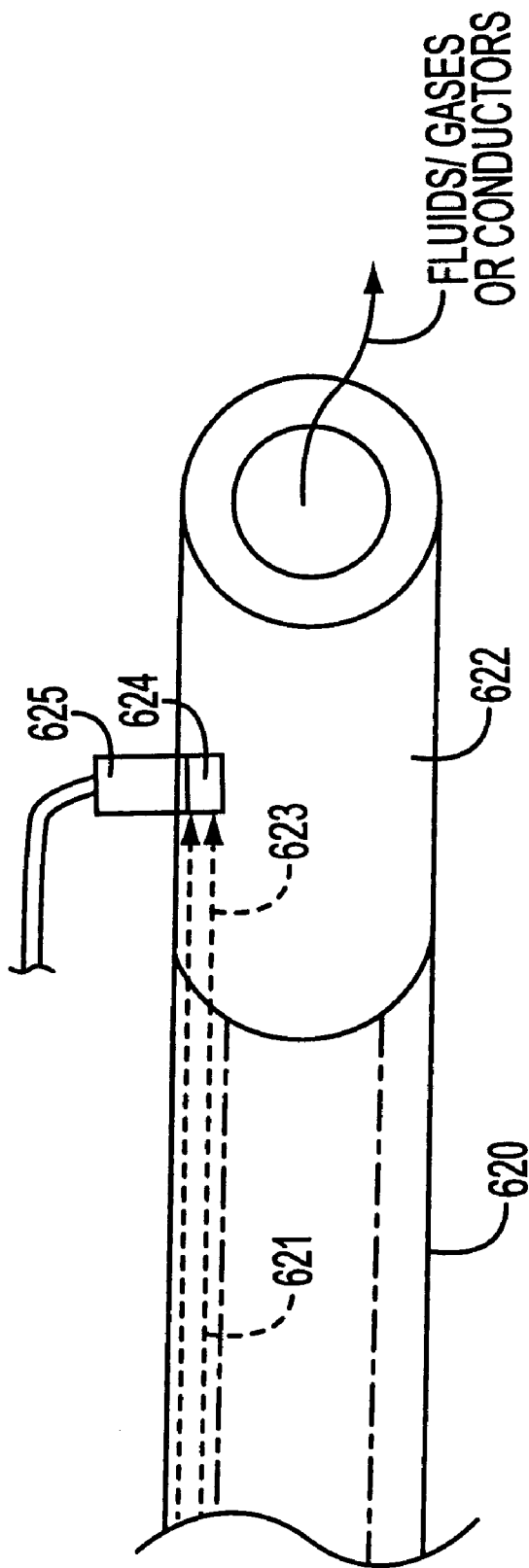
Figure 13:
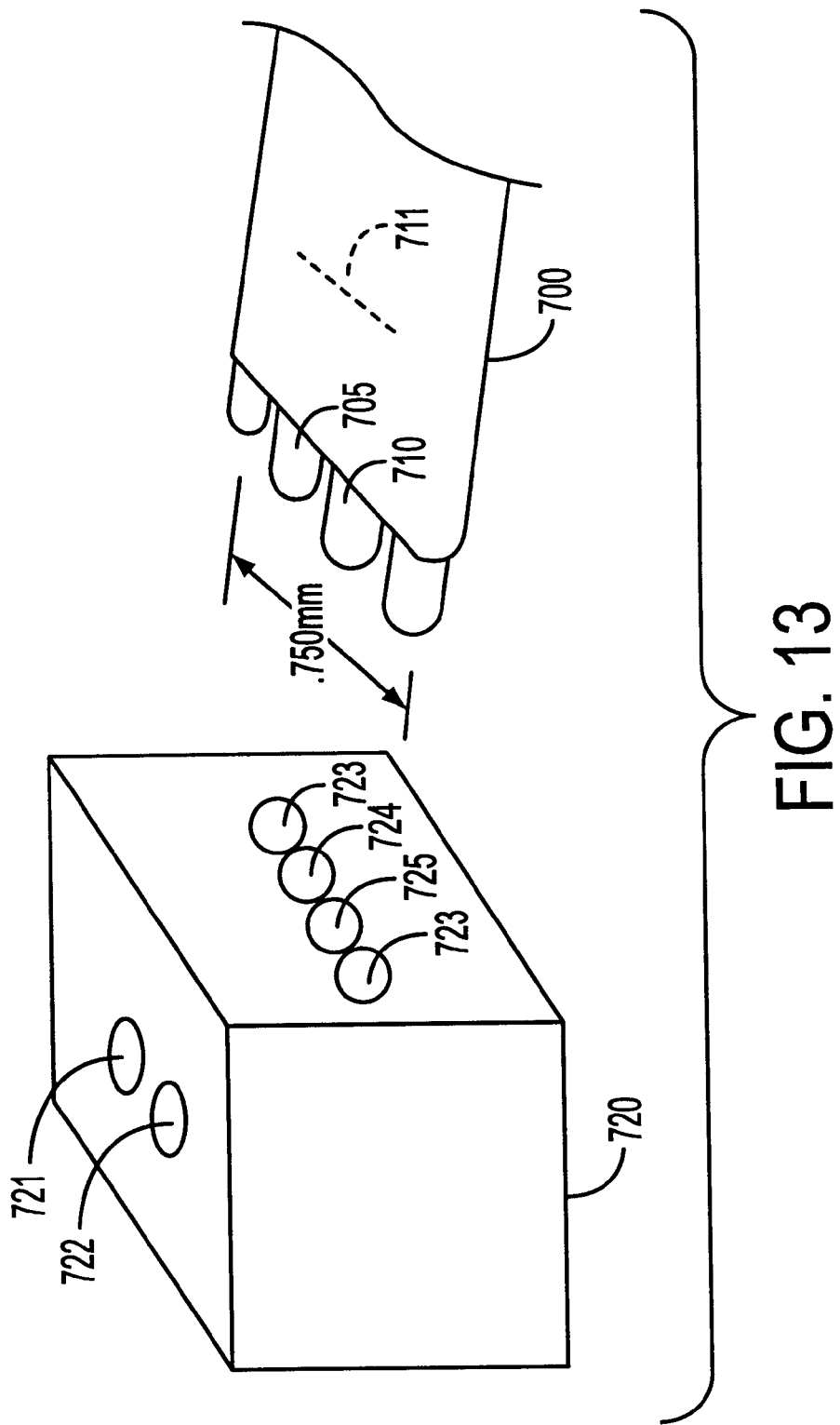

Examples of other embodiments of conduits having side-emitting optical fibers are illustrated in FIGS. 11–13, respectively. FIG. 11 illustrates an optical fiber ribbon 600 having a plurality of optical fibers 610 disposed inside the optical fiber ribbon 600. A side emitting optical fiber 611 is disposed at a location of the ribbon 600 so that the location of the ribbon 600 may be determined, for example, in dense ribbon control panels.

Another advantage of the side-emitting fiber in the ribbon, is that it become a position identifier and a point to reference the other optical fibers from, when an operation such as splicing is desired. This allows for the operator or the splicing machine to detect/confirm that the fibers from each ribbon are aligned correctly without the operator having to use individual fiber colors or outer ribbon print markings to indicate the correct match-up.

FIG. 12 illustrates a hose 620 having a side-emitting optical fiber 621 disposed the length of the hose 620. The hose may be a conduit for air, water, gases, fluids or conductors, in which for example, it is desired to locate the hose at any point along its length in a dense hydraulic control box or panel. As illustrated, a hose coupling 622 is disposed on an end of hose 620. Hose coupling 622 has a coupling channel 623 for receiving the side-emitting optical fiber 621. A light source 624, such as an LED, is positioned in the hose coupling 622 for providing light to the side-emitting optical fiber 621. Power can be provided through a light source connector 625 to illuminate light source 624.

FIG. 13 illustrates an embodiment where a MT-RJ cable is adapted for a side-emitting optical fiber. MT-RJ cables are a common configuration of cables known in the art, thus detailed a description is omitted. Here, an MT connector 720 has a light source or switch 721 and a power source 722. The connector 720 has a plurality of receiving holes for receiving the cable 700. The receiving holes may include optical transmission fiber receiving holes for 723 for transmission of data, a side-emitting optical fiber receiving hole for receiving side-emitting optical fiber 705, and a conductor receiving hole 725 for providing power to cable conductor 710. Cable jacket has a translucent portion thereof to allow side-emitting optical fiber 705 to be observed therethrough.

Figure 14:
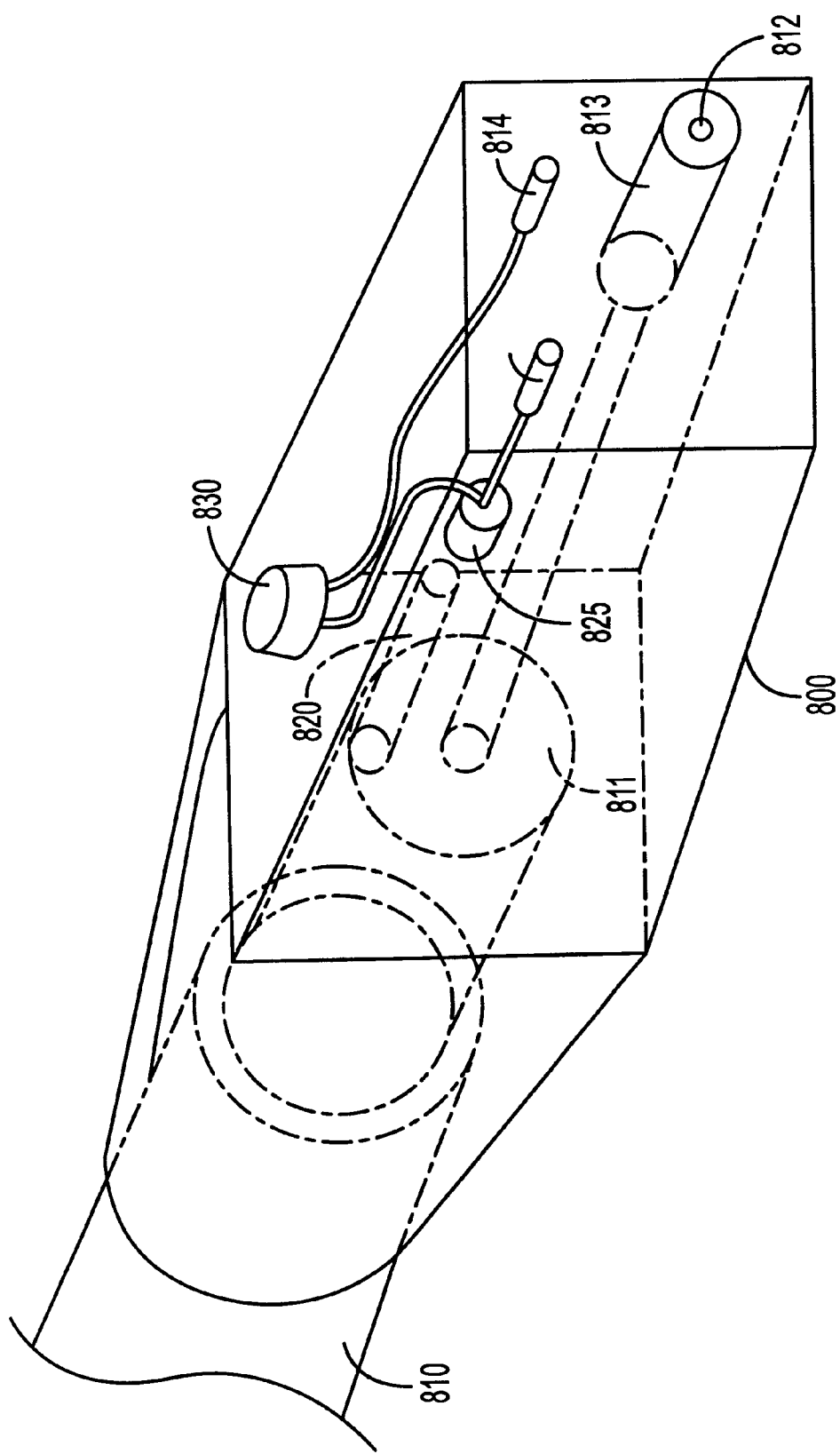
FIG. 14: illustrates a side-emitting and optical fiber connector

FIG. 14 illustrates one example of a side-emitting and optical fiber connector 800. As illustrated, a cable or conduit 810 has a side-emitting optical fiber 820, and is capped with the connector 800. Here, aramid 811 surrounds a communications optical fiber 812 and is adapted for connection to a communications port by an optical fiber precision connector ceramic pin 813. Connector 800 also has power source pins 814 which provide power to LED 825. Switch 830, when closed, provides power to LED 825 via power pins 814. In this manner, LED 825 illuminates and end of side-emitting optical fiber 820 for detection purposes.

Connector 800 is illustrated as a rectangular box to enhance drawing comprehension, but may be any number of shapes as the skilled artisan would recognize. Additionally, the connector 800 is provided only to promote understanding of a potential connection device, and can be adapted in numerous ways as would be apparent to one of ordinary skill.

Although there have been described preferred embodiments of this novel invention, many variations and modifications are possible and the embodiments described herein are not limited by the specific disclosure above, but rather should be limited only by the scope of the appended claims.

What is claimed is:

1. An optically observable cable comprising:
    a transmission cable;
        a side-emitting optical fiber disposed on a periphery of said transmission cable and extending along a length of said transmission cable; and
        a cable jacket encapsulating said transmission cable and said side-emitting optical fiber, wherein said cable jacket is at least partially translucent.

2. The optically observable cable according to claim 1, wherein said transmission cable comprises a conduit for conducting signals, and an insulating jacket.

3. The optically observable cable according to claim 2, wherein said conduit comprises an optical fiber.

4. The optically observable cable according to claim 2, wherein said conduit comprises an electrical conductor.

5. An optically detectable cable comprising:
    a conduit for conducting a signal;
    a side emitting fiber optic fiber disposed adjacent to said conduit and running a length of said conduit; and
    a cable jacket disposed around said conduit and said side emitting fiber, said cable jacket having a translucent portion thereof for allowing said side emitting fiber optic cable to be optically exposed through said cable jacket.

6. The optically detectable cable according to claim 5, wherein said conduit for conducting said signal comprises an optical fiber and an aramid disposed around said optical fiber.

7. The optically detectable cable according to claim 5, wherein said conduit comprises at least one electrical conductor.

8. The optically detectable cable according to claim 7, wherein said at least one electrical conductor is insulated with an insulating material, and wherein the insulated electrical conductor is housed by a conductive shielding member.

9. The optically detectable cable according to claim 5, wherein the cable jacket is made entirely of a translucent material.

10. A communication system having a plurality of optically detectable cables, said communication system comprising:
    a transmission unit for transmitting communication signals through said plurality of optically detectable cables; and
    a receiving unit for receiving the transmitted communication signals, wherein each of said optically detectable cables comprises a conduit for conducting said communication signals, a side emitting optical fiber disposed adjacent to said conduit and running a length of said conduit; and a cable jacket disposed around said conduit and said side emitting optical fiber, said cable jacket having a translucent portion thereof for allowing said side emitting optical fiber to be optically exposed through said cable jacket.

11. The communication system according to claim 10, wherein each of the translucent portions of the cable jackets of said plurality of optically detectable cables are various colors such that each of said plurality of optically detectable cable are distinguishable from one another.

12. A method for detecting individual cables from amongst a plurality of signal transmission cables each having side-emitting optical fibers, said method comprising:

positioning a light source at an interface which houses an end of a cable to be detected;

transmitting light from said light source into said interface; and observing light emitted along an axis of the cable to be detected.

13. The method for detecting individual cables according to claim 12, further comprising, identifying individual cables by a color of light emitted along the axes of said plurality of signal transmission cables.

14. A method for detecting individual cables from amongst a plurality of signal transmission cables each having side-emitting optical fibers, said method comprising:

positioning a hand-held light source near a side-emitting optical fiber located in a cable to be detected;

injecting light from said hand-held light source into said side-emitting optical fiber of said cable to be detected; and observing light emitted along an axis of the cable to be detected.

15. An optically detectable conduit comprising:

a longitudinal conduit;

a side-emitting optical fiber disposed along a length of said longitudinal conduit; and a conduit jacket for housing said longitudinal conduit and side-emitting optical fiber, said conduit jacket having at least a partially translucent portion thereof, so as to allow said side-emitting optical fiber to be optically exposed therethrough.

16. A connector for connecting an optically detectable cable having a conduit and a side-emitting optical fiber, said connector comprising:

a connector body for receiving an end of said optically detectable cable; and a light source disposed in said connector and adapted to illuminate the side-emitting optical fiber of said optically detectable cable;

wherein said connector body includes an interface for interfacing said conduit with a desired conduit interface connection.

17. The optically detectable conduit according to claim 15, wherein said optically detectable conduit is a ribbon cable, wherein said longitudinal conduit comprises a plurality of communication optical fibers, and wherein said side-emitting optical fiber is disposed along said plurality of communication optical fibers as a position identifier and a point of reference for said ribbon cable.

* * * * *